US006820885B1

(12) United States Patent
Oshimo

(10) Patent No.: US 6,820,885 B1
(45) Date of Patent: Nov. 23, 2004

(54) WHEELCHAIR APPARATUS

(76) Inventor: Enichiro Oshimo, 2800 Plaza del Amo #306, Torrance, CA (US) 90503

( * ) Notice: Subject to any disclaimer, the term of this patent is extended or adjusted under 35 U.S.C. 154(b) by 108 days.

(21) Appl. No.: 10/076,472

(22) Filed: Feb. 15, 2002

(51) Int. Cl.$^{7}$ .................................................. B62M 1/14
(52) U.S. Cl. .................... 280/243; 280/244; 280/250.1; 280/304.1
(58) Field of Search ................................ 280/244–249, 280/242.1, 250.1, 304.1, 253, 256, 257

(56) References Cited

U.S. PATENT DOCUMENTS

| | | | | | |
|---|---|---|---|---|---|
| 3,994,509 | A | | 11/1976 | Schaeffer | 280/242 |
| 4,560,181 | A | | 12/1985 | Herron | 280/242 |
| 4,762,332 | A | * | 8/1988 | Seol | 280/250.1 |
| 4,811,964 | A | * | 3/1989 | Horn | 280/250.1 |
| 4,840,076 | A | * | 6/1989 | Brubaker et al. | 74/143 |
| 4,865,344 | A | | 9/1989 | Romero, Sr. et al. | 280/242 |
| 5,020,815 | A | * | 6/1991 | Harris et al. | 280/246 |
| D330,177 | S | | 10/1992 | Shetter | D12/131 |
| 5,167,168 | A | * | 12/1992 | Beumer | 74/810.1 |
| 5,632,499 | A | | 5/1997 | Hutcherson et al. | 280/246 |
| 5,865,455 | A | | 2/1999 | Taylor | 280/250.1 |
| 5,941,547 | A | * | 8/1999 | Drake | 280/243 |
| 6,158,757 | A | * | 12/2000 | Tidcomb | 280/250.1 |
| 6,247,715 | B1 | * | 6/2001 | Korosue | 280/242.1 |

* cited by examiner

*Primary Examiner*—Lesley D. Morris
*Assistant Examiner*—L. Lum

(57) ABSTRACT

A wheelchair apparatus for permitting a user to sit in an upright position while operating a wheelchair. The wheelchair apparatus includes a chair member being designed for supporting the user. The chair member has a seat portion. The chair member has a frame portion. The chair member has at least one drive wheel. The drive wheel is rotatably coupled to the frame portion. The chair member has at least one support wheel. The support wheel is coupled to the frame portion. The support wheel is designed for permitting the chair member to roll along the support surface. At least one lever assembly is operationally coupled to the drive wheel. The lever assembly is coupled to the chair member. The lever assembly is for rotating the drive wheel for propelling the chair member across the support surface when the lever assembly is actuated by the user.

19 Claims, 5 Drawing Sheets

WHEELCHAIR APPARATUS

BACKGROUND OF THE INVENTION

1. Field of the Invention

The present invention relates to wheelchairs and more particularly pertains to a new wheelchair apparatus for permitting a user to sit in an upright position while operating a wheelchair.

2. Description of the Prior Art

The use of wheelchairs is known in the prior art. U.S. Pat. No. 5,865,455 describes a device for permitting a user to use levers to facilitate propelling the wheel chair forward. Another type of wheelchairs is U.S. Pat. No. 5,632,499 having a system having a pair of levers coupled to wheel of a wheel chair to propel the wheelchair forward. U.S. Pat. No. 4,865,344 has a apparatus having a bicycle chain coupled between a lever arm and a wheel of a wheelchair to propel the wheelchair forward. U.S. Pat. No. 4,560,181 has a lever arm with a pair of arms with a ratcheting mechanism positioned around coupled to a wheel of the wheel chair so that the wheel is rotated when the lever arm is actuated in a forward and backward direction. U.S. Pat. No. 3,994,509 has a means for propelling a wheelchair forward comprising a series of bicycle chains coupled between a lever arm and a wheel so that movement of the lever arm rotates the wheel for propelling the wheelchair.

SUMMARY OF THE INVENTION

An object of the present invention is to provide a new wheelchair apparatus that facilitates changing mechanical advantage between the lever member and the drive wheel of the wheel chair.

To this end, the present invention generally comprises a chair member being designed for supporting the user. The chair member has a seat portion. The seat portion is designed for receiving the user when the user is sitting on the chair member. The chair member has a frame portion. The chair member has at least one drive wheel. The drive wheel is rotatably coupled to the frame portion whereby the drive wheel is designed for being actuated by the user for propelling the chair member along a support surface. The chair member has at least one support wheel. The support wheel is coupled to the frame portion. The support wheel is designed for permitting the chair member to roll along the support surface. At least one lever assembly is operationally coupled to the drive wheel. The lever assembly is coupled to the chair member. The lever assembly is for rotating the drive wheel for propelling the chair member across the support surface when the lever assembly is actuated by the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
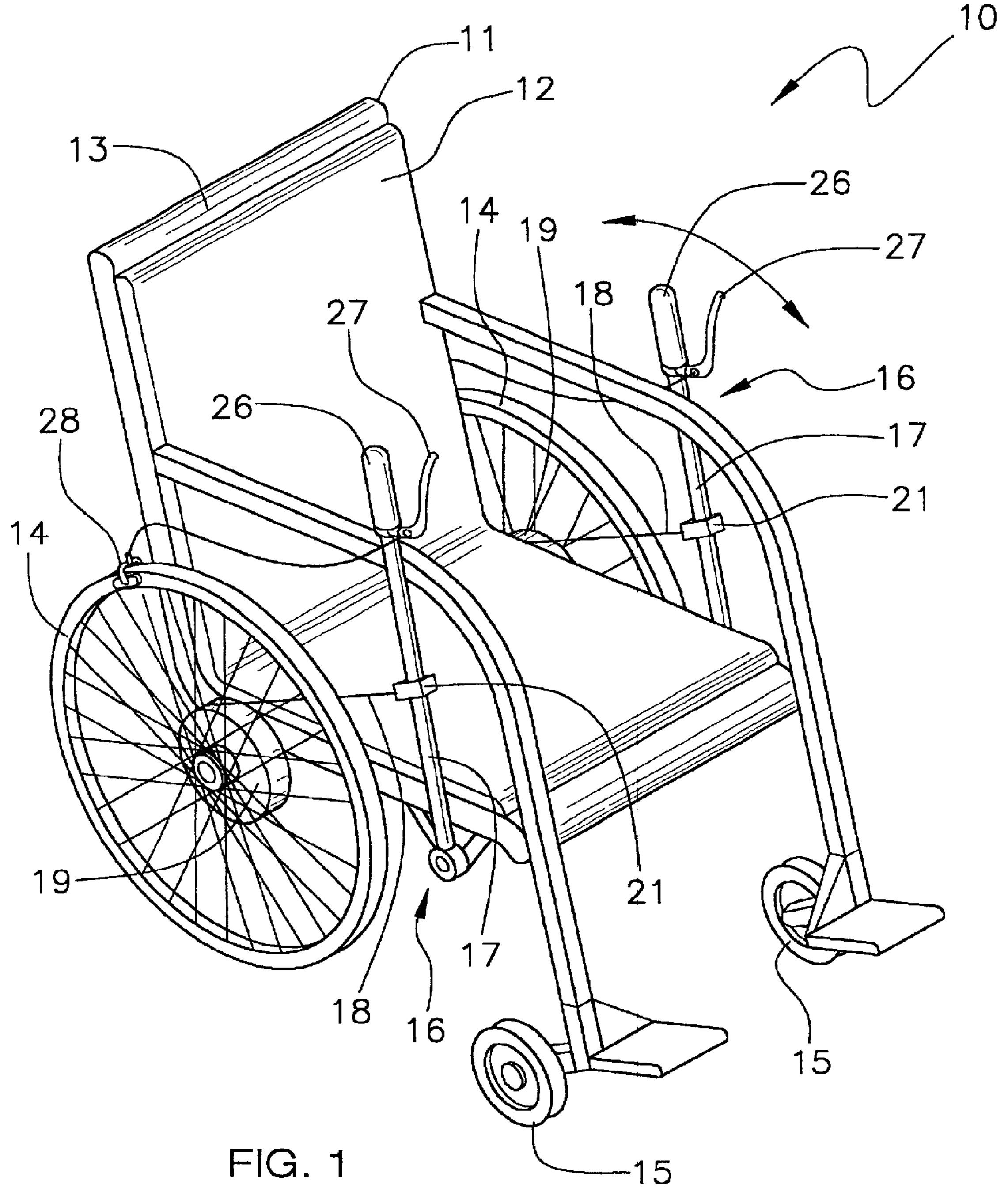
FIG. 1 is a perspective view of a new wheelchair apparatus according to the present invention.
Figure 2:
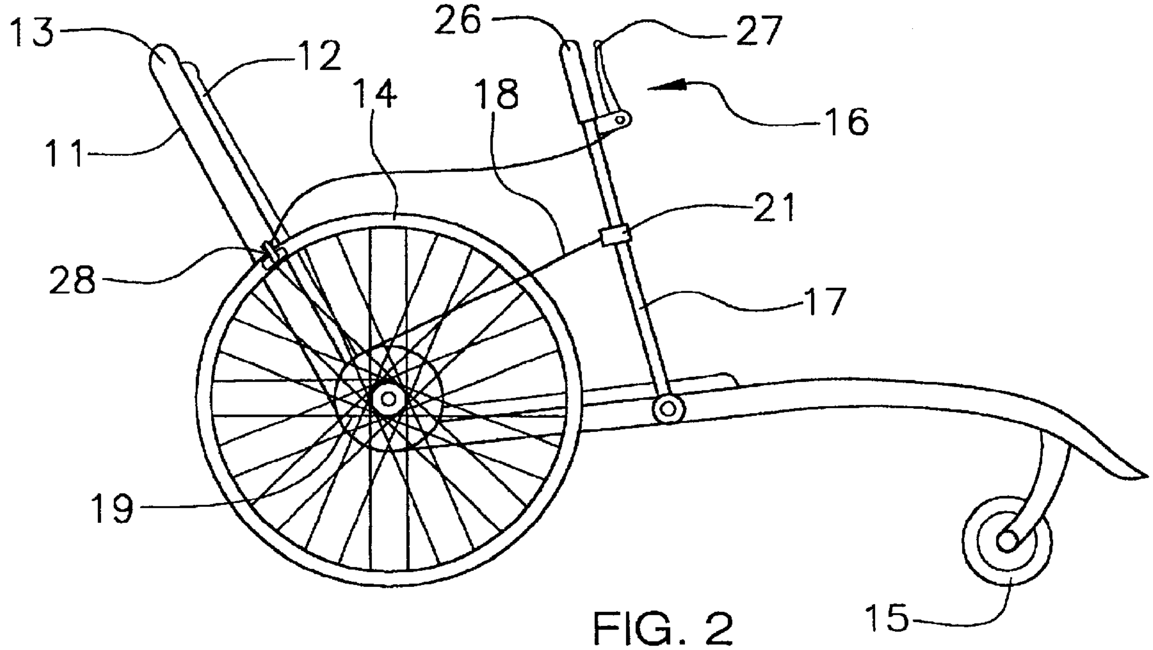
FIG. 2 is a side view of an alternate embodiment of the present invention.
Figure 3:
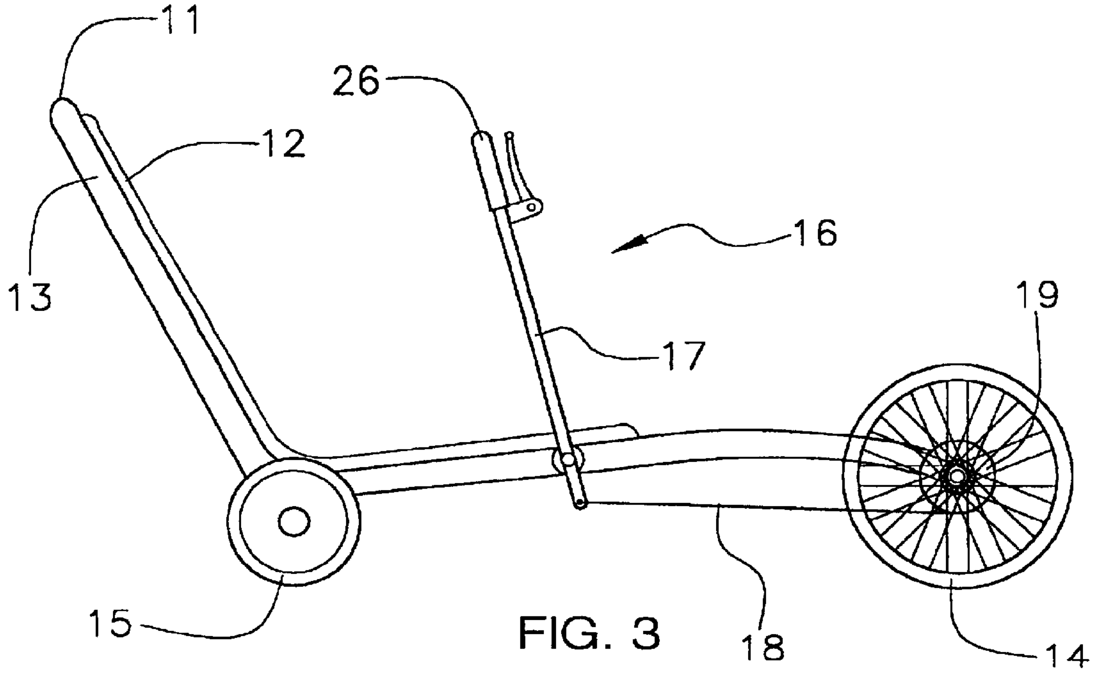
FIG. 3 is a side view of an alternate embodiment of the present invention.
Figure 4:
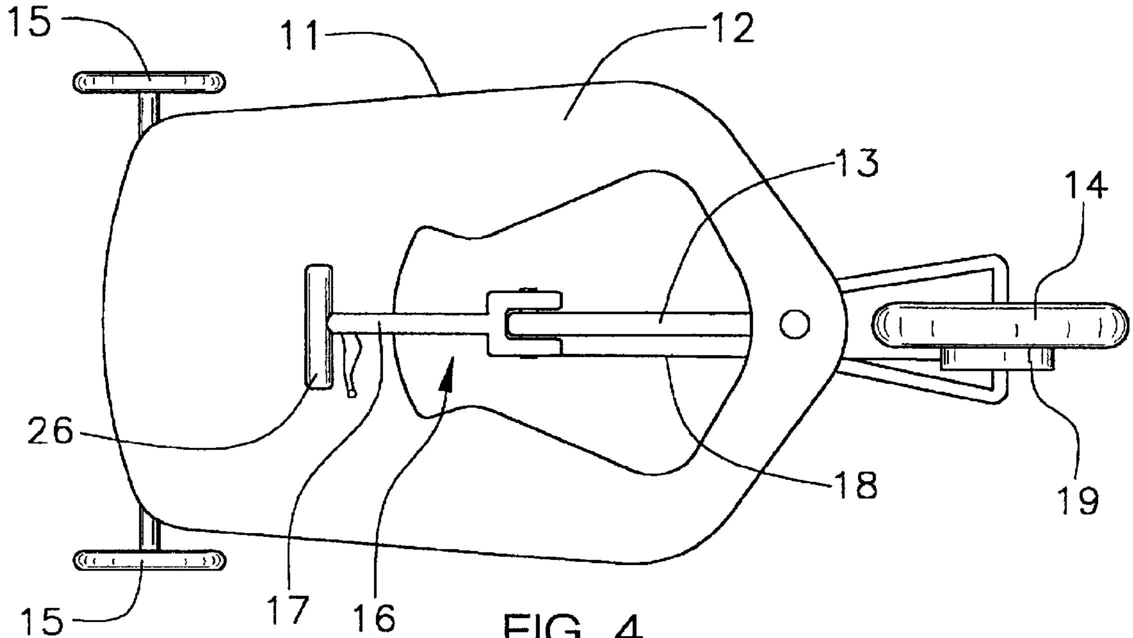
FIG. 4 is a top view of an alternate embodiment of the present invention.
Figure 5:
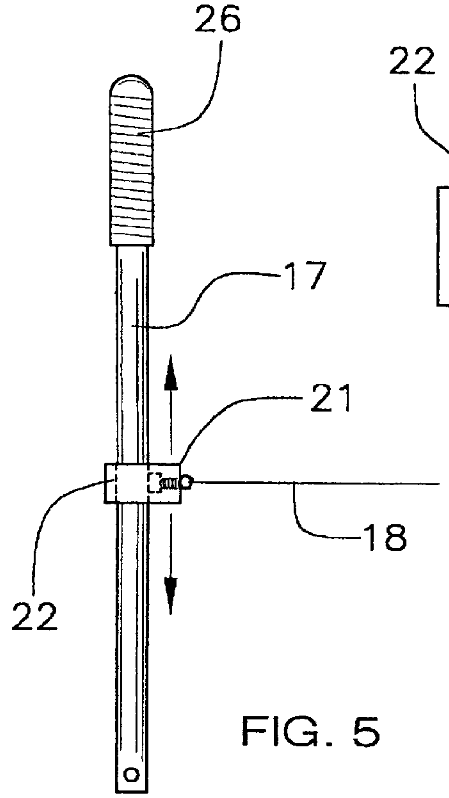
FIG. 5 is a side view of the lever member and gear coupler of the present invention.
Figure 7:
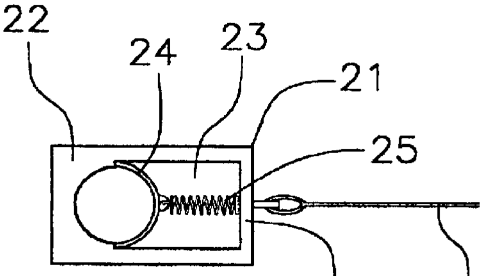
FIG. 7 is a top view of the gear coupler of the present invention.

With reference now to the drawings, and in particular to FIGS. 1 through 6 thereof, a new wheelchair apparatus embodying the principles and concepts of the present invention and generally designated by the reference numeral 10 will be described.

As best illustrated in FIGS. 1 through 6, the wheelchair apparatus 10 generally comprises a chair member 11 being designed for supporting the user. The chair member 11 has a seat portion 12. The seat portion 12 is designed for receiving the user when the user is sitting on the chair member 11. The chair member 11 has a frame portion 13. The chair member 11 has a pair of drive wheels 14. The drive wheels 14 are rotatably coupled to the frame portion 13 whereby the drive wheels 14 are designed for being actuated by the user for propelling the chair member 11 along a support surface. The chair member 11 has at least one support wheel 15. The support wheel 15 is coupled to the frame portion 13. The support wheel 15 is designed for permitting the chair member 11 to roll along the support surface.

Each of a pair lever assemblies 16 is operationally coupled to one of the drive wheels 14. The lever assemblies 16 are coupled to the chair member 11. Each of the lever assemblies 16 is for rotating the associated one of the drive wheels 14 for propelling the chair member 11 across the support surface when the lever assemblies 16 are actuated by the user.

Each of the lever assemblies 16 has a lever member 17. The lever member 17 is pivotally coupled to the frame portion 13 of the chair member 11. Each of the lever assemblies 16 has a cable member 18 being coupled between the lever member 17 of the associated one of the lever assemblies 16 and the associated one of the drive wheels 14 of the chair member 11. The cable member 18 is for rotating the drive wheel of the chair member 11 for propelling the chair member 11 forward when the lever member 17 of the associated one of the lever assemblies 16 is actuated by the user.

A pair of clutching means 19 are for permitting rotation of the drive wheels 14 in a direction to propel the chair member 11 forward. Each of the clutching means 19 is coupled between the cable member 18 of one of the lever assemblies 16 and the associated one of the drive wheels 14 of the chair member 11. Each of the clutching means 19 engages the associated one of the drive wheels 14 when the lever member 17 of the associated one of the lever assemblies 16 is pushed forward drawing the cable member 18 away from one of the drive wheels 14 for rotating the associated one of the drive wheels 14. Each of the clutching means 19 disengages the associated one of the drive wheels 14 when the cable member 18 of the associated one of the lever assemblies 16 slackens when the lever member 17 is drawn back.

A clutch biasing member 20 is coupled to each of the clutching means 19. The clutch biasing member 20 is positioned in a tensed state when the associated one of the clutching means 19 is rotated by the cable member 18. The clutch biasing member 20 recoils from the tensed state for rotating the associated one of the clutching means 19 for winding the cable member 18 onto the clutching means 19 when the lever member 17 is drawn back by the user.

Each of the lever assemblies 16 has a gearing coupler 21. The gearing coupler 21 is coupled to the cable member 18. The gearing coupler 21 is slidably coupled to the lever member 17 whereby the gearing coupler 21 is slidable along a portion of a length of the lever member 17 for changing the length through which the cable member 18 is drawn.

The gearing coupler 21 has a sleeve portion 22. The sleeve portion 22 has an aperture 23 extending through the sleeve portion 22. The lever arm 33 extends through the aperture 23 of the sleeve portion 22 of the gearing coupler 21 whereby the sleeve portion 22 slidably engages the lever arm 33.

The gearing coupler 21 has an arcuate plate 24. The arcuate plate 24 is slidably positioned in the aperture 23 of the sleeve portion 22 of the gearing coupler 21. The arcuate plate 24 is for maintaining pressure against the lever member 17 for inhibiting inadvertent sliding of the gearing coupler 21 with respect to the lever member 17 when the lever member 17 is being actuated by the user.

The gearing coupler 21 has a plate biasing member 25. The plate biasing member 25 is positioned between the arcuate plate 24 and a rear wall 37 of the sleeve portion 22. The plate biasing member 25 is for biasing the arcuate plate 24 against the lever member 17 for maintaining contact between the lever member 17 and the arcuate plate 24 of the gearing coupler 21.

Each of the lever assemblies 16 has a handle portion 26. The handle portion 26 is coupled to the lever member 17. The handle portion 26 is designed for being engaged by a hand of the user for providing a gripping surface for the hand of the user.

A brake handle 27 may be coupled to the lever member 17 of each lever assembly. The brake handle 27 is operationally coupled to a braking assembly 28 coupled to an associated one of the drive wheels 14 such that actuation of the brake handle 27 by the user actuates the associated braking assembly 28 to decelerate the rotation of the associated one of the drive wheels 14 to slow the wheelchair.

Figure 6:
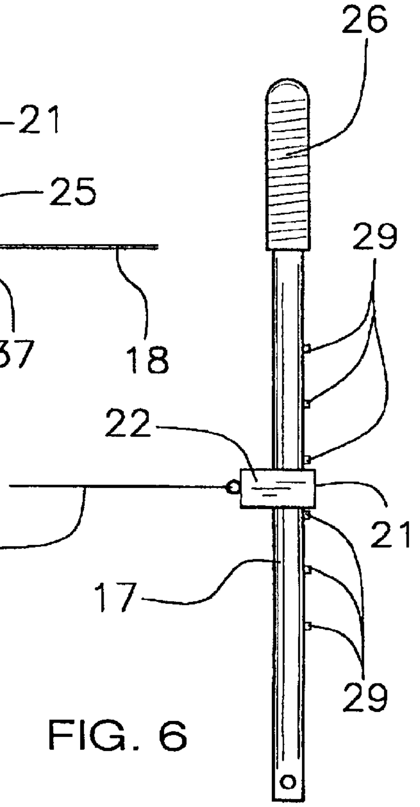
FIG. 6 is a side view of an alternate embodiment of the lever member of the present invention.
Figure 8:
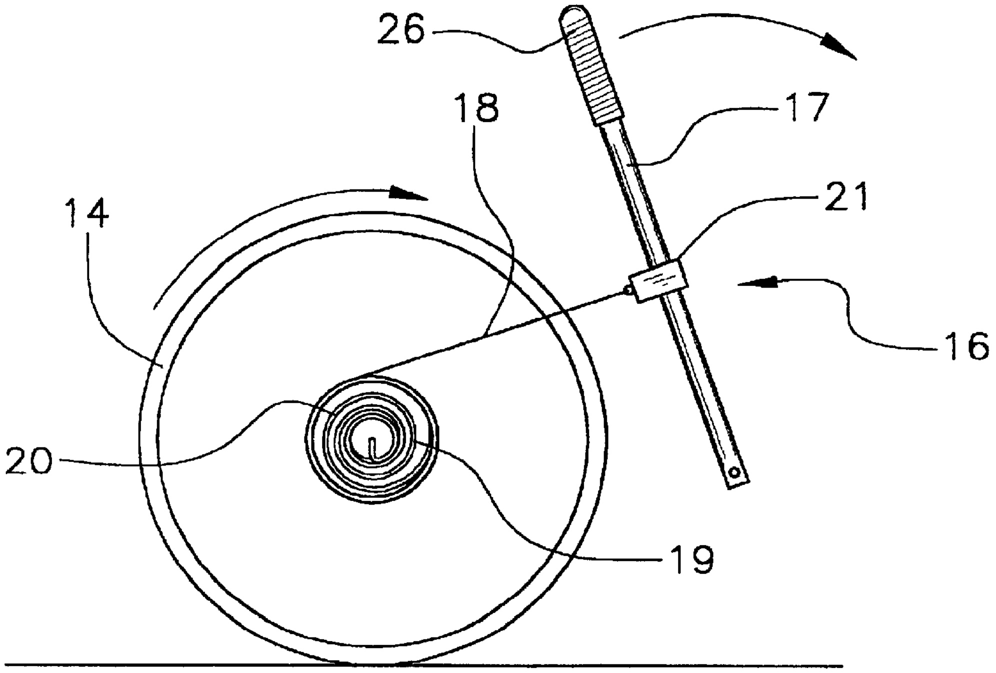
FIG. 8 is a side view of the lever assembly and drive wheel of the present invention in use.
Figure 9:
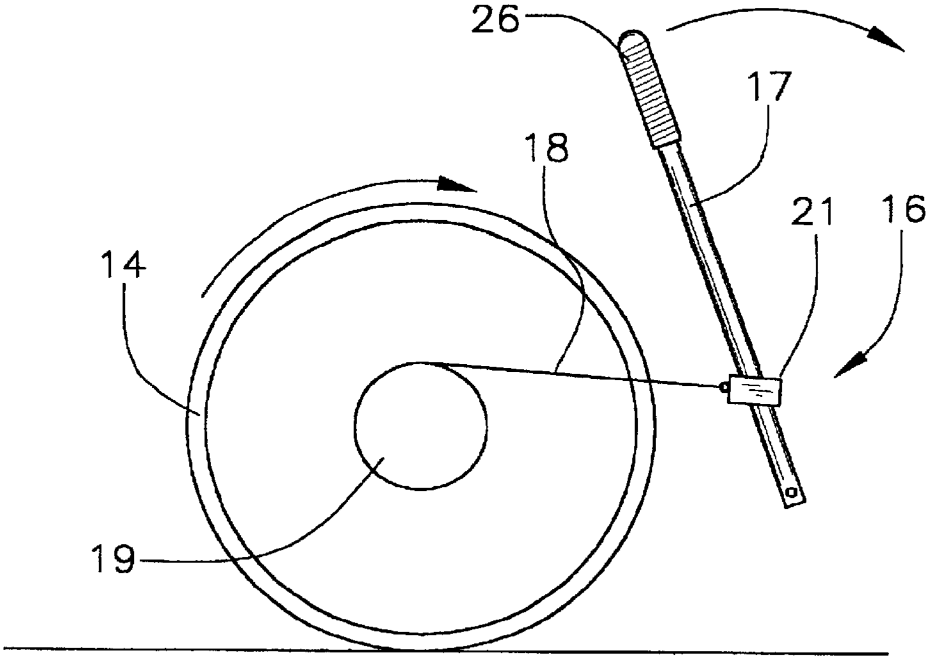
FIG. 9 is a side view of the lever assembly and drive wheel with the gear coupler in an alternate position of the present invention in use.

In an embodiment, as shown in FIG. 6, the lever member 17 of each of the lever assemblies 16 has a plurality of stopping nubs 29. The stopping nubs 29 are spaced along a portion of the length of the lever member 17 whereby the gearing coupler 21 is selectively positionable between an adjacent pair of the stopping nubs 29. Each of the stopping nubs 29 is for inhibiting inadvertent sliding of the gearing coupler 21 along the length of the lever member 17.

Figure 10:
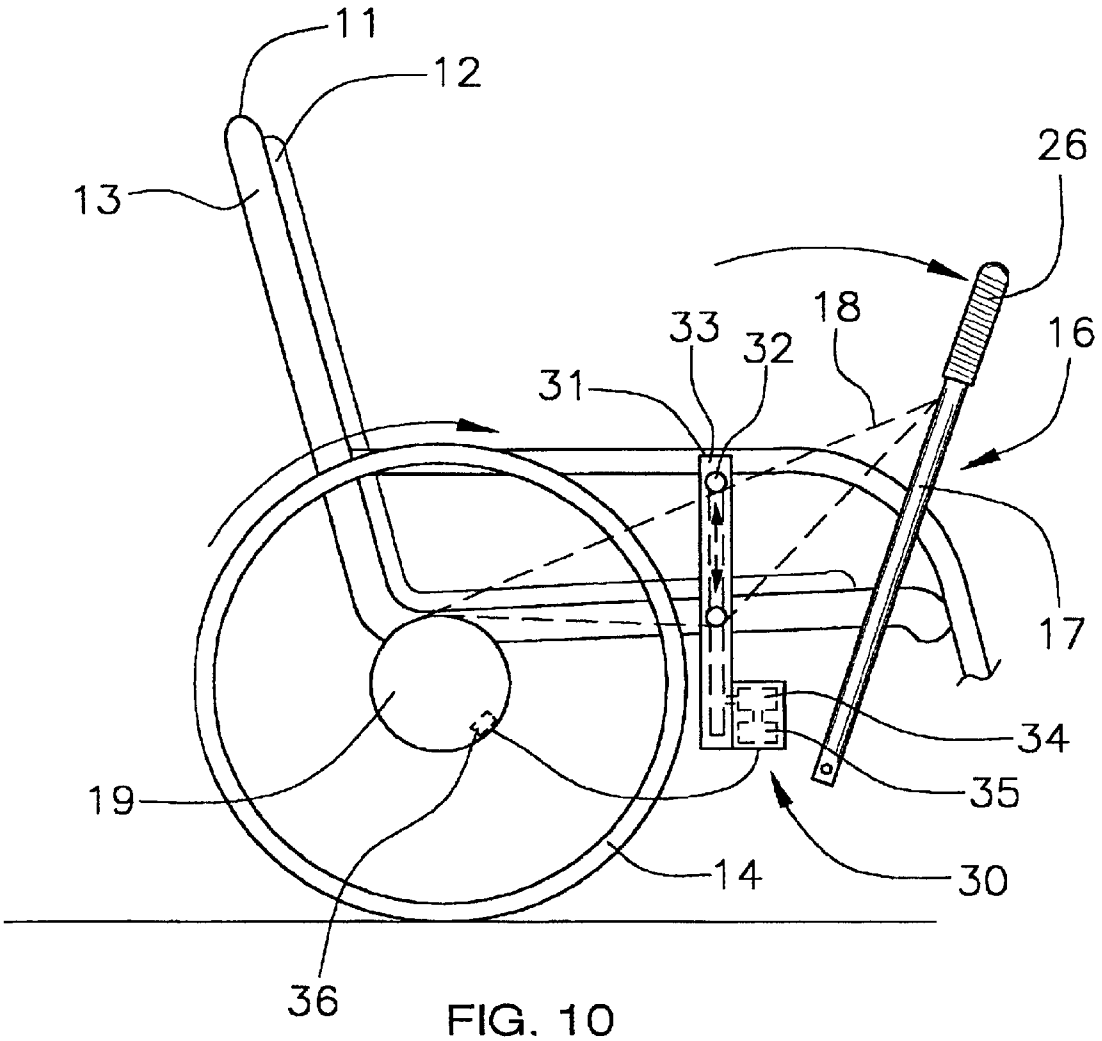
FIG. 10 is a side view of the gearing assembly of the present invention.

In an embodiment. As shown in FIG. 10. A gearing assembly 30 is coupled the frame of the chair. The gearing assembly 30 is operationally coupled to the cable member 18 of the lever assembly whereby the gearing assembly 30 is for changing a draw length of the cable member 18 when the lever member 17 is actuated by the user. The gearing assembly 30 has a housing 31. The housing 31 is coupled to the frame portion 13 of the chair member 11. The gearing assembly 30 has a positional member 32. The positional member 32 is operationally coupled to the cable member 18 of the lever assembly. The positional member 32 is slidably coupled to an arm 33 of the housing 31 whereby the positional member 32 is positionable alone a portion of a length of the arm 33 of the housing 31 for changing the length the cable member 18 is drawn when the lever member 17 is actuated by the user. The gearing assembly 30 has a motor 34. The motor 34 is positioned within the housing 31. The motor 34 is operationally coupled to the positional member 32 whereby the motor 34 is for moving the positional member 32 along the portion of the length of the arm 33 of the housing 31. The gearing assembly 30 has a processing assembly 35 and a sensor member 36. The processing assembly 35 is operationally coupled to the motor 34. The sensor member 36 is operationally coupled between the drive wheel and the processing assembly 35. The sensor member 36 is for sensing rotational speed of the drive wheel whereby the processing assembly 35 actuates the motor 34 to position the positional member 32 for maintaining a substantially consistent speed.

In use, the user is positioned on the seat portion 12. The user can then place a hand on a lever member 17 of the lever assemblies 16. The user can then push forward on the lever member 17 to have the cable member 18 rotate the clutching means 19 coupled to the associated on of the drive wheels 14 to propel the chair member 11. The clutching means 19 then disengages the associated one of the drive wheels 14 and the clutch biasing member 20 rotates the clutching means 19 to wind the cable member 18 onto the clutching means 19 when the user draws the lever member 17 back. The brake handle 27 can the be engaged to actuate the braking assembly 28 to slow the chair member 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheelchair apparatus for permitting a user to propel himself/herself through arm movement, the wheelchair apparatus comprising:

a chair member being adapted for supporting the user, said chair member having a seat portion, said seat portion being adapted for receiving the user when the user is sitting on said chair member, said chair member having a frame portion, said chair member having at least one drive wheel, said drive wheel being rotatably coupled to said frame portion such that said drive wheel is adapted for being actuated by the user for propelling said chair member along a support surface, said chair member having at least one support wheel, said support wheel being coupled to said frame portion, said support wheel being adapted for permitting said chair member to roll along the support surface;

at least one lever assembly being operationally coupled to said drive wheel, said lever assembly being coupled to said chair member, said lever assembly rotating said drive wheel for propelling said chair member across the support surface when said lever assembly is actuated by the user;

said lever assembly having a lever member, said lever member being pivotally coupled to said frame portion of said chair member, said lever assembly having a cable member being coupled between said lever member and said drive wheel of said chair member, said cable member rotating said drive wheel of said chair member for propelling said chair member forward when said lever member is actuated by the user;

a clutching means being for permitting rotation of said drive wheel in a direction to propel said chair member forward, said clutching means being coupled between said cable member of said lever assembly and said drive wheel of said chair member, said clutching means engaging said drive wheel when said lever member of said lever assembly is pushed forward drawing said cable member away from said drive wheel for rotating said drive wheel, said clutching means disengaging said drive wheel when said cable member slackens when said lever member is drawn back; and a clutch biasing member being coupled to said clutching means, said clutch biasing member being positioned in a tensed state when said clutching means is rotated by said cable member, said clutch biasing member recoiling from said tensed state for rotating said clutching means for winding said cable member onto said clutching means when said lever member is drawn back by the user.

2. The wheelchair apparatus as set forth in claim 1, further comprising:

said lever assembly having a gearing coupler, said gearing coupler being coupled to said cable member, said gearing coupler being slidably coupled to said lever member such that said gearing coupler is slidable along a portion of a length of said lever member for changing the length through which said cable member is drawn.

3. The wheelchair apparatus as set forth in claim 2, further comprising:

said gearing coupler having a sleeve portion, said sleeve portion having an aperture extending through said sleeve portion, said lever arm extending through said aperture of said sleeve portion of said gearing coupler such that said sleeve portion slidably engages said lever arm.

4. The wheelchair apparatus as set forth in claim 3, further comprising:

said gearing coupler having an arcuate plate, said arcuate plate being slidably positioned in said aperture of said sleeve portion of said gearing coupler, said arcuate plate maintaining pressure against said lever member for inhibiting inadvertent sliding of said gearing coupler with respect to said lever member when said lever member is being actuated by the user.

5. The wheelchair apparatus as set forth in claim 4, further comprising:

said gearing coupler having a plate biasing member, said plate biasing member being positioned between said arcuate plate and a rear wall of said sleeve portion, said plate biasing member being for biasing said arcuate plate against said lever member for maintaining contact between said lever member and said arcuate plate of said gearing coupler.

6. The wheelchair apparatus as set forth in claim 2, further comprising:

said lever member of said lever assembly having a plurality of stopping nubs, said stopping nubs being spaced along a portion of said length of said lever member such that said gearing coupler is selectively positionable between an adjacent pair of said stopping nubs, each of said stopping nubs being for inhibiting inadvertent sliding of said gearing coupler along said length of said lever member.

7. The wheelchair apparatus as set forth in claim 1, further comprising:

said lever assembly having a handle portion, said handle portion being coupled to said lever member, said handle portion being adapted for being engaged by a hand of the user for providing a gripping surface for the hand of the user.

8. The wheelchair apparatus as set forth in claim 1, further comprising:

a gearing assembly being coupled said frame of said chair, said gearing assembly being operationally coupled to said cable member of said lever assembly such that said gearing assembly is for changing a draw length of said cable member when said lever member is actuated by the user.

9. The wheelchair apparatus as set forth in claim 8, further comprising:

said gearing assembly having a housing, said housing being coupled to said frame portion of said chair member; and said gearing assembly having a positional member, said positional member being operationally coupled to said cable member of said lever assembly, said positional member being slidably coupled to an arm of said housing such that said positional member is positionable alone a portion of a length of said arm of said housing for changing the length said cable member is pulled to rotate said drive wheel when said lever member is actuated by the user.

10. The wheelchair apparatus as set forth in claim 9, further comprising:

said gearing assembly having a motor, said motor being positioned within said housing, said motor being operationally coupled to said positional member such that said motor is for moving said positional member along said portion of said length of said arm of said housing.

11. The wheelchair apparatus as set forth in claim 10, further comprising:

said gearing assembly having a processing assembly and a sensor member, said processing assembly being operationally coupled to said motor, said sensor member being operationally coupled between said drive wheel and said processing assembly, said sensor member being for sensing a rotational speed of said drive wheel such that said processing assembly actuates said motor to position said positional member for maintaining a substantially consistent speed.

12. A wheelchair apparatus for permitting a user to propel himself/herself through arm movement, the wheelchair apparatus comprising:

a chair member being adapted for supporting the user, said chair member having a seat portion, said seat portion being adapted for receiving the user when the user is sitting on said chair member, said chair member having a frame portion, said chair member having at least one drive wheel, said drive wheel being rotatably coupled to said frame portion such that said drive wheel is adapted for being actuated by the user for propelling said chair member along a support surface, said chair member having at least one support wheel, said support wheel being coupled to said frame portion, said support wheel being adapted for permitting said chair member to roll along the support surface;

at least one lever assembly being operationally coupled to said drive wheel, said lever assembly being coupled to said chair member, said lever assembly rotating said drive wheel for propelling said chair member across the support surface when said lever assembly is actuated by the user;

said lever assembly having a lever member, said lever member being pivotally coupled to said frame portion of said chair member, said lever assembly having a cable member being coupled between said lever member and said drive wheel of said chair member, said cable member rotating said drive wheel of said chair member for propelling said chair member forward when said lever member is actuated by the user;

said lever assembly having a gearing coupler, said gearing coupler being coupled to said cable member, said gearing coupler being slidably coupled to said lever member such that said gearing coupler is slidable along a portion of a length of said lever member for changing the length through which said cable member is drawn; and said lever member of said lever assembly having a plurality of stopping nubs, said stopping nubs being spaced along a portion of said length of said lever member such that said gearing coupler is selectively positionable between an adjacent pair of said stopping nubs, each of said stopping nubs being for inhibiting inadvertent sliding of said gearing coupler along said length of said lever member.

13. The wheelchair apparatus as set forth in claim 12, further comprising:

said gearing coupler having a sleeve portion, said sleeve portion having an aperture extending through said sleeve portion, said lever arm extending through said aperture of said sleeve portion of said gearing coupler such that said sleeve portion slidably engages said lever arm.

14. The wheelchair apparatus as set forth in claim 13, further comprising:

said gearing coupler having an arcuate plate, said arcuate plate being slidably positioned in said aperture of said sleeve portion of said gearing coupler, said arcuate plate maintaining pressure against said lever member for inhibiting inadvertent sliding of said gearing coupler with respect to said lever member when said lever member is being actuated by the user.

15. The wheelchair apparatus as set forth in claim 14, further comprising:

said gearing coupler having a plate biasing member, said plate biasing member being positioned between said arcuate plate and a rear wall of said sleeve portion, said plate biasing member being for biasing said arcuate plate against said lever member for maintaining contact between said lever member and said arcuate plate of said gearing coupler.

16. A wheelchair apparatus for permitting a user to propel himself/herself through arm movement, the wheelchair apparatus comprising:

a chair member being adapted for supporting the user, said chair member having a seat portion, said seat portion being adapted for receiving the user when the user is sitting on said chair member, said chair member having a frame portion, said chair member having at least one drive wheel, said drive wheel being rotatably coupled to said frame portion such that said drive wheel is adapted for being actuated by the user for propelling said chair member along a support surface, said chair member having at least one support wheel, said support wheel being coupled to said frame portion, said support wheel being adapted for permitting said chair member to roll along the support surface;

at least one lever assembly being operationally coupled to said drive wheel, said lever assembly being coupled to said chair member, said lever assembly rotating said drive wheel for propelling said chair member across the support surface when said lever assembly is actuated by the user;

said lever assembly having a lever member, said lever member being pivotally coupled to said frame portion of said chair member, said lever assembly having a cable member being coupled between said lever member and said drive wheel of said chair member, said cable member rotating said drive wheel of said chair member for propelling said chair member forward when said lever member is actuated by the user;

a gearing assembly being coupled said frame of said chair, said gearing assembly being operationally coupled to said cable member of said lever assembly such that said gearing assembly is for changing a draw length of said cable member when said lever member is actuated by the user;

said gearing assembly having a housing, said housing being coupled to said frame portion of said chair member;

said gearing assembly having a positional member, said positional member being operationally coupled to said cable member of said lever assembly, said positional member being slidably coupled to an arm of said housing such that said positional member is positionable alone a portion of a length of said arm of said housing for changing the length said cable member is pulled to rotate said drive wheel when said lever member is actuated by the user; and said gearing assembly having a motor, said motor being positioned within said housing, said motor being operationally coupled to said positional member such that said motor is for moving said positional member along said portion of said length of said arm of said housing.

17. The wheelchair apparatus as set forth in claim 16, further comprising:

said gearing assembly having a processing assembly and a sensor member, said processing assembly being operationally coupled to said motor, said sensor member being operationally coupled between said drive wheel and said processing assembly, said sensor member being for sensing a rotational speed of said drive wheel such that said processing assembly actuates said motor to position said positional member for maintaining a substantially consistent speed.

18. A wheelchair apparatus for permitting a user to propel himself/herself through arm movement, the wheelchair apparatus comprising:

a chair member being adapted for supporting the user, said chair member having a seat portion, said seat portion being adapted for receiving the user when the user is sitting on said chair member, said chair member having a frame portion, said chair member having at least one drive wheel, said drive wheel being rotatably coupled to said frame portion such that said drive wheel is adapted for being actuated by the user for propelling said chair member along a support surface, said chair member having at least one support wheel, said support wheel being coupled to said frame portion, said support wheel being adapted for permitting said chair member to roll along the support surface;

at least one lever assembly being operationally coupled to said drive wheel, said lever assembly being coupled to said chair member, said lever assembly rotating said drive wheel for propelling said chair member across the support surface when said lever assembly is actuated by the user;

said lever assembly having a lever member, said lever member being pivotally coupled to said frame portion of said chair member, said lever assembly having a cable member being coupled between said lever member and said drive wheel of said chair member, said cable member rotating said drive wheel of said chair member for propelling said chair member forward when said lever member is actuated by the user;

said lever assembly having a gearing coupler, said gearing coupler being coupled to said cable member, said gearing coupler being slidably coupled to said lever member such that said gearing coupler is slidable along a portion of a length of said lever member for changing the length through which said cable member is drawn;

said gearing coupler having a sleeve portion, said sleeve portion having an aperture extending through said sleeve portion, said lever arm extending through said aperture of said sleeve portion of said gearing coupler such that said sleeve portion slidably engages said lever arm; and said gearing coupler having an arcuate plate, said arcuate plate being slidably positioned in said aperture of said sleeve portion of said gearing coupler, said arcuate plate maintaining pressure against said lever member for inhibiting inadvertent sliding of said gearing coupler with respect to said lever member when said lever member is being actuated by the user.

19. The wheelchair apparatus as set forth in claim 18, further comprising:

said gearing coupler having a plate biasing member, said plate biasing member being positioned between said arcuate plate and a rear wall of said sleeve portion, said plate biasing member being for biasing said arcuate plate against said lever member for maintaining contact between said lever member and said arcuate plate of said gearing coupler.

* * * * *